(12) United States Patent
Borsch

(10) Patent No.: US 7,082,869 B2
(45) Date of Patent: Aug. 1, 2006

(54) SENSOR ARRANGEMENT FOR A VACUUM BRAKE BOOSTER AND A VACUUM BRAKE BOOSTER PROVIDED WITH THIS SENSOR ARRANGEMENT

(75) Inventor: Stefan Borsch, Winningen (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/452,746

(22) Filed: Jun. 2, 2003

(65) Prior Publication Data

US 2003/0213239 A1 Nov. 20, 2003

Related U.S. Application Data

(63) Continuation of application No. PCT/EP01/14291, filed on Dec. 5, 2001.

(30) Foreign Application Priority Data

Dec. 8, 2000 (DE) .............................. 100 61 152

(51) Int. Cl.
*F01B 31/12* (2006.01)
*F15B 9/10* (2006.01)
(52) U.S. Cl. .......................................... 91/1; 91/376 R
(58) Field of Classification Search .................. 91/1
See application file for complete search history.

(56) References Cited

U.S. PATENT DOCUMENTS

| 4,633,757 A | 1/1987 | Kubota |
| 4,683,757 A | 8/1987 | Adams et al. |
| 5,317,924 A | 6/1994 | Maack |
| 5,711,204 A | 1/1998 | Michels |
| 5,918,462 A | 7/1999 | Mitani |
| 6,324,845 B1 | 12/2001 | Fulks et al. |
| 6,434,456 B1 * | 8/2002 | Babala et al. ............. 303/113.3 |

FOREIGN PATENT DOCUMENTS

| DE | 44 36 297 | 4/1996 |
| DE | 197 29 158 | 10/1998 |
| DE | 197 35 892 | 11/1998 |
| JP | 05302864 | 11/1993 |
| WO | WO 99/02385 | * 1/1999 |

* cited by examiner

*Primary Examiner*—F. Daniel Lopez
(74) *Attorney, Agent, or Firm*—MacMillan, Sobanski & Todd, LLC

(57) ABSTRACT

The invention relates to a sensor arrangement (10) for a vacuum brake booster with a brake booster housing comprising at least one vacuum chamber and at least one working chamber that is separated from the latter by a moveable wall and is connectable either to vacuum or at least atmospheric pressure, as well as a bore (34) disposed in the brake booster housing. The sensor arrangement (10) comprises a partition (16) which seals the brake booster housing off from ambient atmosphere when the sensor arrangement (10) is assembled. The sensor arrangement (10) also comprises a carrier element (14), which is passed through the bore (34) and disposed in the interior of the brake booster in the assembled state. A pressure sensor (12) is disposed on the carrier element (14). The carrier element (14) with the pressure sensor (12) projects into the interior of the brake booster housing such that the pressure sensor (12) is positioned in the vacuum chamber or the working chamber of the brake booster.

18 Claims, 3 Drawing Sheets

SENSOR ARRANGEMENT FOR A VACUUM BRAKE BOOSTER AND A VACUUM BRAKE BOOSTER PROVIDED WITH THIS SENSOR ARRANGEMENT

CROSS REFERENCE TO RELATED APPLICATIONS

This application is a continuation of International Application No. PCT/EP01/14291 filed Dec. 5, 2001, the disclosures of which are incorporated herein by reference, and which claimed priority to German Patent Application No. 100 61 152.4 filed Dec. 8, 2000, the disclosures of which are incorporated herein by reference.

BACKGROUND OF THE INVENTION

The invention relates to a sensor arrangement for a vacuum brake booster for determining the pressure conditions prevailing in such a brake booster and a vacuum brake booster provided with a sensor arrangement of this kind.

Information on the pressure conditions prevailing in a vacuum brake booster can be used in various ways. For example, the maximum output operating state of the brake booster, i.e. the state as from which the brake booster is no longer able to assist a further pressure increase, can be detected by sensing the pressure states in the brake booster. Furthermore, sensing of the level of the vacuum in a vacuum chamber of the brake booster may serve, for example, to control a vacuum pump creating the vacuum.

It is of particular advantage to sense the pressure states in a brake booster which is provided with an electromagnetic actuating unit. An electromagnetic actuating unit of this kind enables the vehicle brake system to be actuated by activating the brake booster in addition or as an alternative to pedal force-proportional actuation by the driver. For example, the above-mentioned electromagnetic actuating unit affords the possibility of operating the brake booster at maximum output independently of the pedal actuating force applied by the driver in a critical driving situation, e.g. when emergency braking, and thus providing the maximum possible braking force assistance (so-called brake assistant function). The pressure build-up speed in the working chamber of a brake booster can be used to recognize when a braking action is an emergency braking action. Knowledge of the pressure conditions in the brake booster is also of advantage when braking takes place completely automatically, for example in co-operation with a distance control system.

DE 44 36 297 A1, and corresponding U.S. Pat. No. 5,711,204 which is incorporated by reference herein, discloses a vacuum brake booster in which a pressure sensor is rigidly connected to a moveable wall disposed between a vacuum chamber and a working chamber. The pressure in the vacuum chamber is measured by a second pressure sensor, which is disposed either outside of a brake booster housing or inside the vacuum chamber.

U.S. Pat. No. 4,633,757, which is incorporated by reference herein, discloses a vacuum brake booster with a pressure sensor disposed in a working chamber and a pressure sensor disposed in a vacuum chamber, wherein the pressure sensors are each secured to an inner wall of the brake booster housing. The disadvantage of these known arrangements lies in the fact that assembly and inspection and any necessary replacement of the pressure sensors give rise to significant difficulties and entail considerable expenditure.

DE 197 29 158 C1, which is incorporated by reference herein, describes a vacuum brake booster with a pressure sensor which is disposed in a housing that is externally flange-mounted on a brake booster housing. The pressure sensor is connected to at least one working chamber and at least one vacuum chamber via air guide ducts, which extend from the housing of the sensor arrangement into the brake booster housing. A solution of this kind requires a complex system of air guide ducts. Moreover, the space requirements are increased as a result of disposing the pressure sensor outside of the brake booster housing.

SUMMARY OF THE INVENTION

An object of the invention is to provide a sensor arrangement for a vacuum brake booster which is structured in the simplest and most space-saving manner possible, although is at the same time easy to assemble and maintain.

This object is achieved according to the invention by a sensor arrangement having the features indicated in claim 1. The sensor arrangement according to the invention is distinguished by the fact that a pressure sensor is disposed in a space-saving manner in the interior of a brake booster housing on a carrier element. Little expenditure is entailed by the assembly or any necessary replacement of the sensor, as the pressure sensor disposed on the carrier element can easily be positioned through a bore formed in the brake booster housing in the interior of the housing. It is not necessary to attach special holders for the pressure sensor, nor to configure the brake booster housing in a special way, which means that rational series production of different brake boosters with the same type of housing is possible. It is also unnecessary to modify the booster geometry. The solution according to the invention also has the advantage of the pressure sensor sensing the pressure directly in a working chamber or a vacuum chamber of the brake booster, which increases accuracy of measurement and reduces susceptibility to errors.

In a preferred embodiment of the sensor arrangement according to the invention the pressure sensor is an absolute pressure sensor which senses the pressure in the vacuum chamber or the working chamber.

The pressure sensor is preferably electrically connected via at least one connecting line which is passed through the partition in a sealing fashion. This, at least one, connecting line may be led outside of the brake booster housing to any desired connection point, for example to an electronic controller.

According to one embodiment of the sensor arrangement according to the invention, the, at least one, connecting line is connected in an electrically conductive manner to the pressure sensor via a conductor track formed on the carrier element. The connecting line then no longer needs to be led over the carrier element to the pressure sensor in order that it may be connected to one or more electrical connections of the sensor, but can instead be easily connected directly to the conductor track formed on the carrier element.

The carrier element preferably consists of an electrically conductive material and is passed through the partition in sealing fashion. There is no need to provide the above-mentioned electrical connecting line in this arrangement, nor apply a conductor track to the carrier element.

The, at least one, connecting line is preferably led to a connector disposed outside of the brake booster housing. The connector disposed outside of the brake booster housing may also be directly connected to the carrier element consisting of electrically conductive material. A configuration of this kind enables the pressure sensor to be preassembled in the brake booster housing, while its electrical connection, for example to an electronic controller, can be established when installing the brake booster by simply connecting the connector.

According to a further embodiment of the sensor arrangement of the invention, the partition is connected in sealing fashion to the inside of a sensor arrangement housing which is in particular cylindrical and the outside of which is intended to engage in sealing fashion with the bore formed in the brake booster housing. This arrangement enables the pressure sensor, the partition and the electrical connecting line(s) to be preassembled in the housing and then fitted in one operation into the bore formed in the brake booster housing.

The partition is preferably part of a housing of an electronic controller, in which an electronic printed circuit board is disposed that is connected in an electrically conductive manner to the pressure sensor. The electronic printed circuit board can be electrically connected to the pressure sensor either via the, at least one, connecting line or the carrier element consisting of electrically conductive material. This embodiment of the invention is distinguished by the fact that the pressure sensor can be preassembled with the electronic controller to form a subassembly. The direct flange-mounting of the controller on the brake booster housing facilitates assembly and saves space. It also enables the connecting paths of the electrical lines to be short and thus less susceptible to interference.

According to a preferred configuration, the carrier element is formed in one piece with the partition, which enables the sensor arrangement to be manufactured at low cost.

A brake booster provided with the sensor arrangement according to the invention can be manufactured at low cost as the sensor arrangement can be positioned in the interior of the vacuum chamber and/or the working chamber of the brake booster in a simple assembly process without having to modify the brake booster housing or the brake booster geometry in a particular way. Not only is the arrangement of the pressure sensors in the interior of the brake booster housing a particularly space-saving measure, but it also enables the pressure conditions in the brake booster to be sensed particularly reliably.

DETAILED DESCRIPTION OF THE INVENTION

Figure 1:
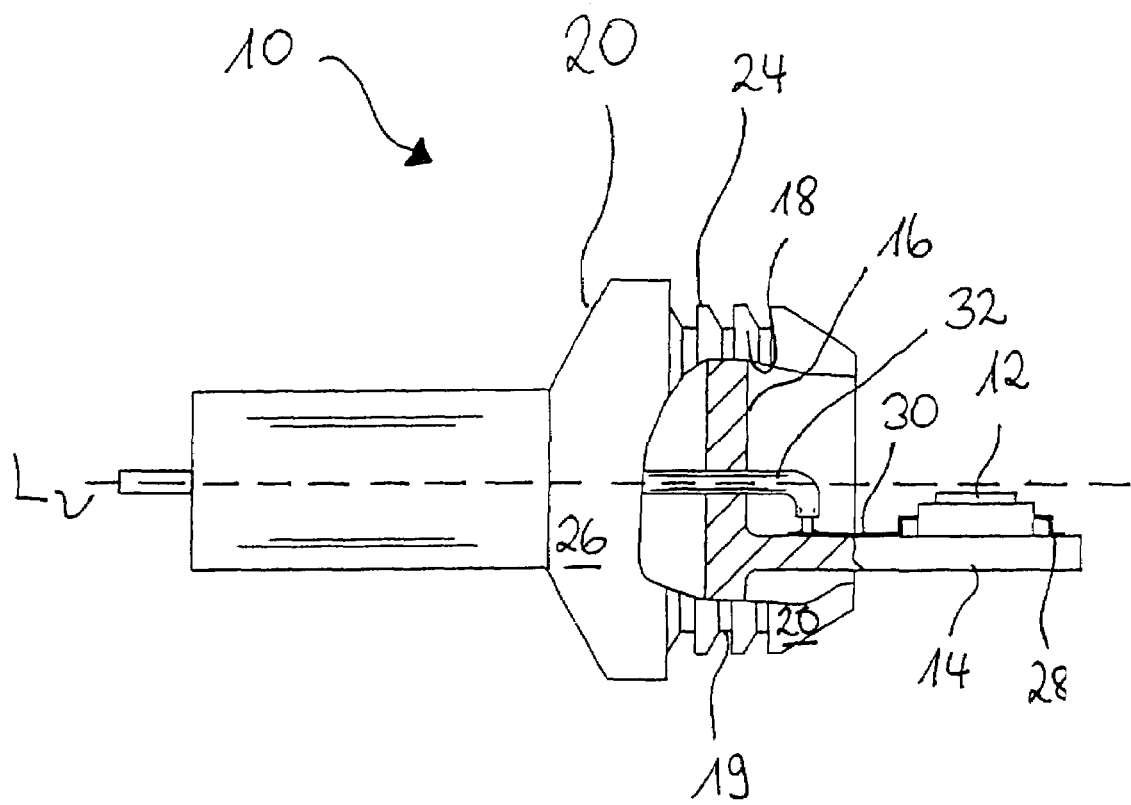
FIG. 1 is a part-sectional side view of a first embodiment of the sensor arrangement according to the invention.

A first embodiment of the sensor arrangement 10 according to the invention is represented in FIG. 1. A pressure sensor 12 constructed as an absolute pressure sensor is disposed on a carrier element 14 extending at a right angle to a partition 16 in the axial direction along a longitudinal axis L. The carrier element 14 and the partition 16 are constructed as a one-piece component, for example as a plastics injection-molded part. The partition 16 is sealingly connected to the inside 18 of a substantially hollow cylindrical first portion 20 of a housing 22 of the sensor arrangement 10. The first housing portion 20 is provided at a region of its outer circumference 19 with sealing ribs 24. The first housing portion 20 is adjoined by a second housing portion 26. The diameter of the second housing portion 26 is at first widened in a region adjacent to the first housing portion 20 in comparison with the diameter of the first housing portion 20 and then decreases continuously along the longitudinal axis L, before it finally remains constant along the longitudinal axis L.

The pressure sensor 12 comprises on two opposite sides electrical connections 28 which are soldered to a metallic conductor track 30 disposed on the carrier element 14. The metallic conductor track 30 is firmly attached to the carrier element 14, so that the pressure sensor 12 is mechanically fixed to the carrier element 14 via its electrical connections 28 soldered to the conductor track 30.

A connecting line 32 is also connected in an electrically conductive manner to the conductor track 30 and passed in sealing fashion through the partition 16 into the second portion 26 of the housing 20, where it may be connected, for example, to a connector, which is not represented here.

In order to install the sensor arrangement 10 in a vacuum brake booster, the first housing portion 20 is inserted in a bore formed in the brake booster housing, although is not represented in the figure. When the sensor arrangement 12 is in the assembled state, the sealing ribs 24 formed at the outer circumference 19 of the first housing portion 20 co-operate with an elastic seal which is disposed in the bore in the housing wall of the brake booster, so that the interior space of the brake booster is separated in a pressure-tight manner from the ambient atmosphere. The carrier element 14 with the pressure sensor 12 then projects into the interior space of the brake booster housing, while the second housing portion 26 projects out of the brake booster housing. The partition 16 provides a seal in the housing 22 against the ambient atmosphere. According to the location of the bore formed in the brake booster housing, the illustrated embodiment of the sensor arrangement of the invention can be used to sense the pressure conditions in a vacuum chamber or a working chamber of a brake booster. It is also possible to use two sensor arrangements according to the invention, one of which serves to sense the pressure in the vacuum chamber and the other to sense the pressure in the working chamber of the brake booster.

Figure 2:
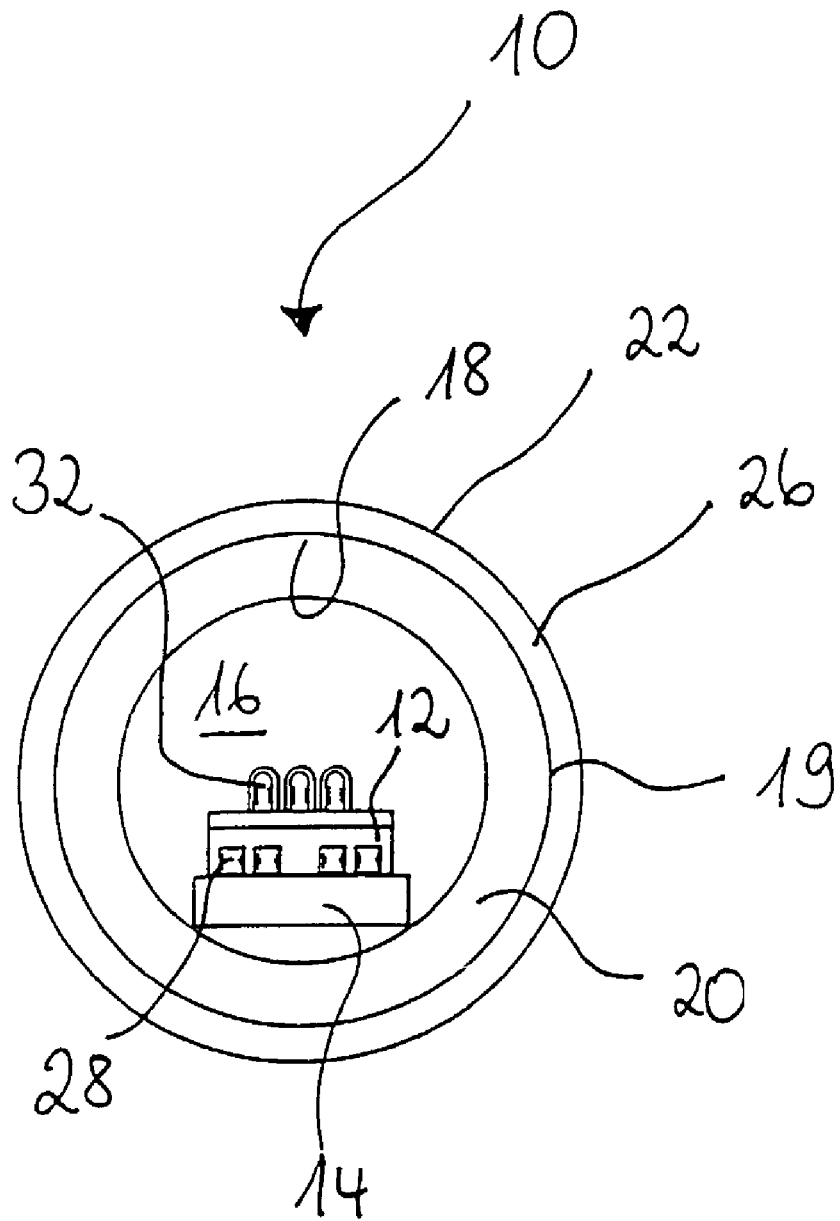
FIG. 2 is a front view of the embodiment of the sensor arrangement according to the invention which is represented in FIG. 1.

As is evident from FIG. 2, the pressure sensor 12 comprises four electrical connections 28 on its one side. One of the four connections 28 can be used for the single calibration of the pressure sensor 12, while the other three connections 28 serve to perform the actual function of the pressure sensor 12, i.e. to sense the pressure conditions in the interior of the brake booster housing.

Figure 3:
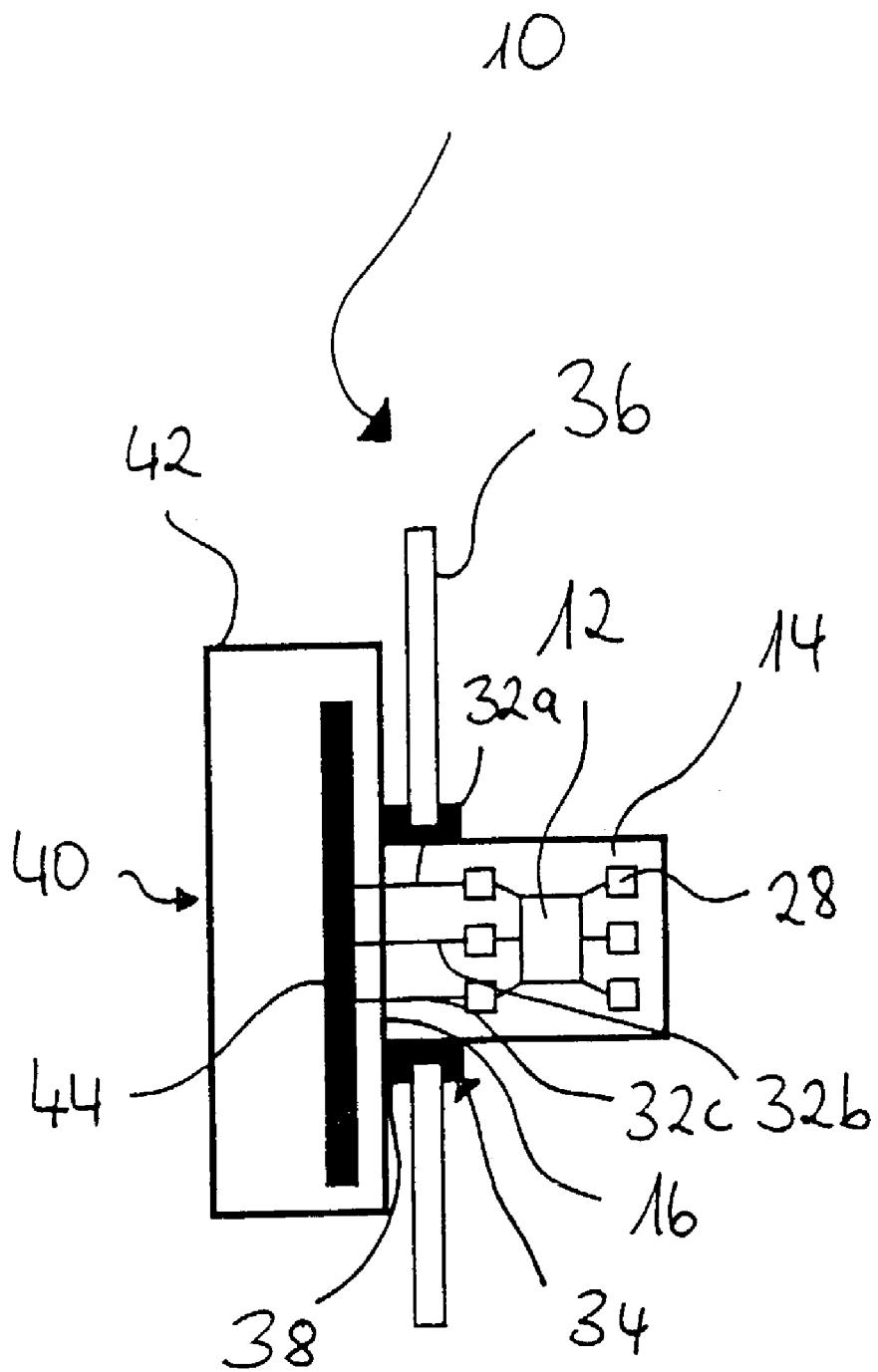
FIG. 3 is a plan view onto a further embodiment of the sensor arrangement according to the invention in the assembled state.

FIG. 3 illustrates a further embodiment of the sensor arrangement 10 according to the invention in assembled state. The carrier element 14 with the pressure sensor 12 projects through a bore 34 in the housing wall 36 into the interior of a brake booster housing, which is not represented in its entirety here. An electronic controller 40 is flange-mounted directly on the housing wall 36 in sealing fashion by means of a sealing element 38. The partition 16, which separates the interior space of the brake booster housing from the ambient atmosphere, is formed by a region of a controller housing 42. The controller 40 comprises an electronic printed circuit board 44, which is connected in an electrically conductive manner via the connecting lines 32a, 32b and 32c directly to the electrical connections 28 of the pressure sensor 12.

According to a further embodiment, which is not represented here, the carrier element 14 consists of an electrically conductive material, for example of metal. The electrical connections 28 of the pressure sensor 12 are then connected directly to the carrier element 14 in an electrically conductive manner. The carrier element 14 is passed through the partition 16 in sealing fashion and can be connected outside of the brake booster housing to an electrical connector, for example.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Sensor arrangement for a vacuum brake booster comprising a brake boaster housing with at least one vacuum chamber and at least one working chamber which is connectable either to vacuum or at least atmospheric pressure, as well as a bore disposed in the brake booster housing, the sensor arrangement comprising:
    a partition which seals the brake booster housing off from the ambient atmosphere when the sensor arrangement is assembled, and
    a carrier element with a pressure sensor, which carrier element is passed through the bore and disposed in the interior of the brake booster housing when the sensor arrangement is assembled, wherein the carrier element is formed in one piece with the partition, and further wherein the carrier element with the pressure sensor projects into the interior of the brake booster housing such that the pressure sensor is positioned in the vacuum chamber or the working chamber of the brake booster.

2. Sensor arrangement according to claim 1, wherein the pressure sensor is an absolute pressure sensor.

3. Sensor arrangement according to claim 1, wherein the pressure sensor is electrically connected via at least one connecting line which is passed through the partition in sealing fashion.

4. Sensor arrangement according to claim 3, wherein the, at least one, connecting line is connected in an electrically conductive manner to the pressure sensor via a conductor track formed on the carrier element.

5. Sensor arrangement according to claim 3, wherein the, at least one, connecting line is led to a connector which is disposed outside of the brake booster housing.

6. Sensor arrangement according to claim 1, wherein the carrier element consists of an electrically conductive material and is passed through the partition in sealing fashion.

7. Sensor arrangement according to claim 6, wherein the carrier element consisting of electrically conductive material is led to a connector which is disposed outside of the brake booster housing.

8. Sensor arrangement according to claim 1, wherein the partition is connected in sealing fashion to the inside of a particularly cylindrical housing the outside of which is intended to engage in sealing fashion with the bore formed in the brake booster housing.

9. Sensor arrangement according to claim 1, wherein the partition is part of a housing of an electronic controller in which an electronic printed circuit board is disposed that is connected in an electrically conductive manner to the pressure sensor.

10. Vacuum brake booster with a brake booster housing containing at least one vacuum chamber and one working chamber, which is separated from the former by a moveable wall and is connectable either to vacuum or at least atmospheric pressure, assembled with a sensor arrangement according to claim 1.

11. Sensor arrangement for a vacuum brake booster comprising a brake booster housing with at least one vacuum chamber and at least one working chamber which is separated from the former by a moveable wall and is connectable either to vacuum or at least atmospheric pressure, as well as a bore disposed in the brake booster housing, the sensor arrangement comprising:
    a partition which seals the brake booster housing off from the ambient atmosphere when the sensor arrangement is assembled, wherein the partition is part of a housing of an electronic controller in which an electronic printed circuit board is disposed that is connected in an electrically conductive manner to the pressure sensor, and
    a carrier element with a pressure sensor, which element is passed through the bore and disposed in the interior of the brake booster housing when the sensor arrangement is assembled, wherein the carrier element with the pressure sensor projects into the interior of the brake booster housing such that the pressure sensor is positioned in the vacuum chamber or the working chamber of the brake booster.

12. Sensor arrangement according to claim 11, wherein the pressure sensor is an absolute pressure sensor.

13. Sensor arrangement according to claim 11, wherein the pressure sensor is electrically connected via at least one connecting line which is passed through the partition in sealing fashion.

14. Sensor arrangement according to claim 13, wherein the at least one, connecting line is connected in an electrically conductive manner to the pressure sensor via a conductor track formed on the carrier element.

15. Sensor arrangement according to claim 13, wherein the, at least one, connecting line is led to a connector which is disposed outside of the brake booster housing.

16. Sensor arrangement according to claim 11, wherein the carrier element consists of an electrically conductive material and is passed through the partition in sealing fashion.

17. Sensor arrangement according to claim 16, wherein the carrier element consisting of electrically conductive material is led to a connector which is disposed outside of the brake booster housing.

18. Sensor arrangement according to claim 11, wherein the partition is connected in sealing fashion to the inside of a particularly cylindrical housing the outside of which is intended to engage in sealing fashion with the bore formed in the brake booster housing.

* * * * *